March 30, 1926. 1,578,872
A. J. WALSH
AUTOMATIC SHUT-OFF VALVE
Filed April 14, 1925
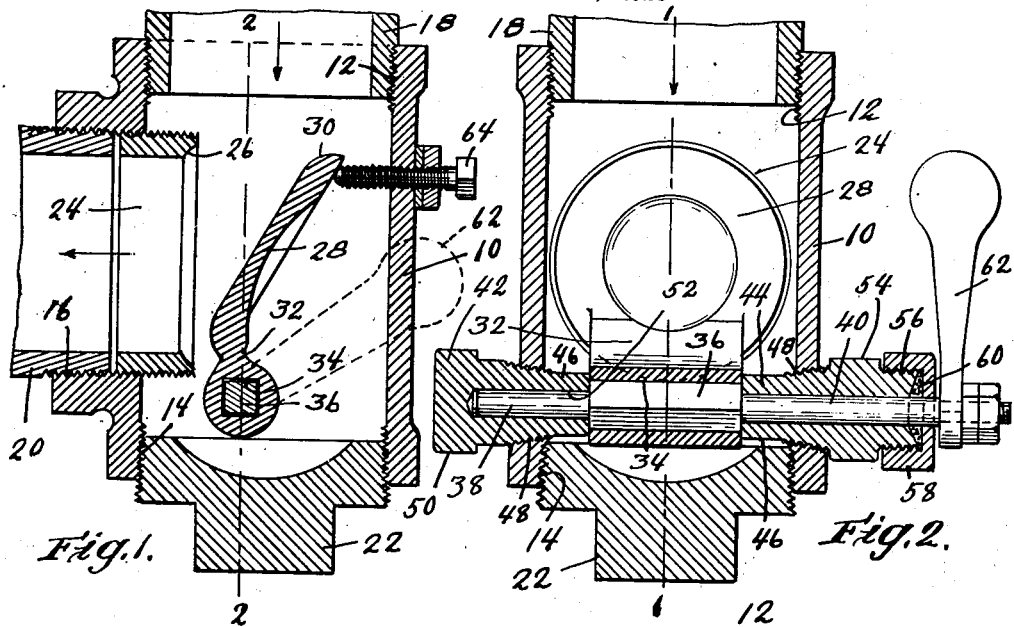
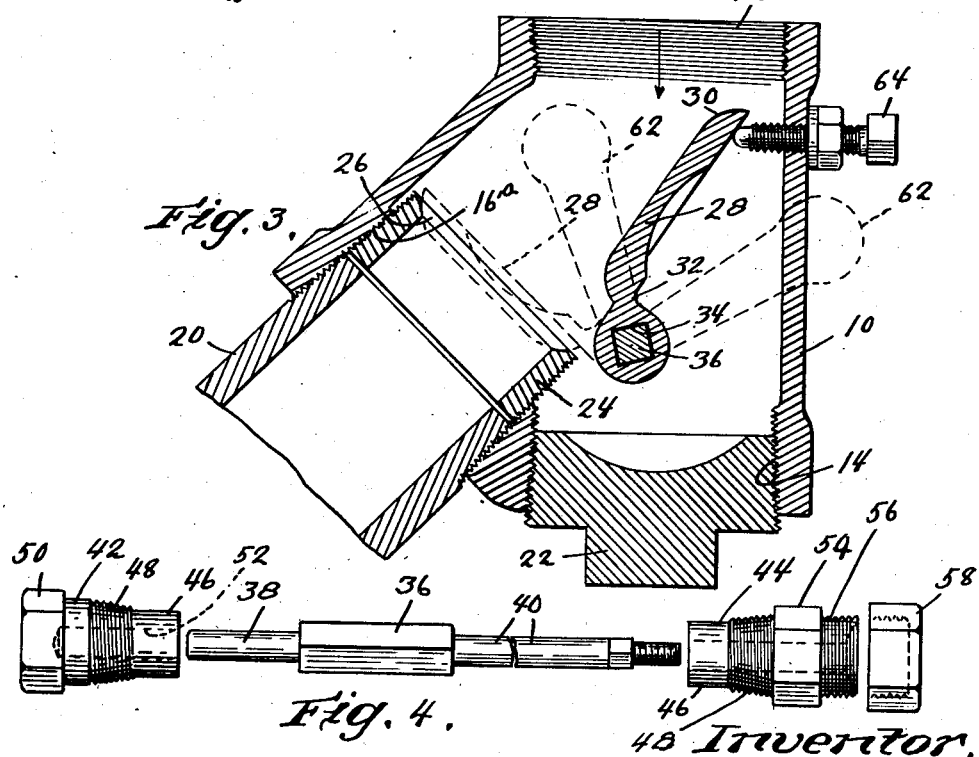

Patented Mar. 30, 1926.

1,578,872

UNITED STATES PATENT OFFICE.

ALBERT J. WALSH, OF WEST SPRINGFIELD, MASSACHUSETTS.

AUTOMATIC SHUT-OFF VALVE.

Application filed April 14, 1925. Serial No. 23,074.

*To all whom it may concern:*

Be it known that I, ALBERT J. WALSH, a citizen of the United States, residing at West Springfield, in the county of Hampden and State of Massachusetts, have invented an Improvement in Automatic Shut-Off Valves, of which the following is a specification.

This invention relates to valves especially adapted for use in a pipe line through which a fluid is adapted to flow at some normal rate, and operate automatically to close and stop the flow of fluid when the flow is increased to some abnormal value, as due to a break in the pipe line beyond the valve.

An object of this invention is the provision of an automatic shut-off valve of the type above described which is adapted to remain open under normal fluid-flow conditions and to be closed by the action of an abnormal flow of fluid upon it.

A further object of the invention is the provision of an automatic shut-off valve with means by which it may be adjusted to close under variable conditions of fluid-flow through it.

A yet further object of the invention is the provision of an automatic shut-off valve which is inexpensive in construction and reliable in operation, and is composed of parts which may be used interchangeably in valve casings having various arrangements of the inlet and outlet openings thereof.

A further object is the provision of an automatic shut-off valve constructed mainly of standard pipe fittings.

A further object is generally to improve the construction and operation of automatic shut-off valves.

Fig. 1 is a sectional elevation of one form of automatic shut-off valve embodying the invention, taken along line 1—1 of Fig. 2.

Fig. 2 is a transverse sectional elevation taken along the line 2—2 of Fig. 1 but with the valve in closed condition.

Fig. 3 is a sectional elevation of a modified form of valve.

Fig. 4 is a disassembled view of the valve-shaft and its bushings.

The valve illustrated in Figs. 1 and 2 includes a casing 10 which is or may be a standard T pipe fitting and may have the aligned pipe-threaded openings 12 and 14 and a third pipe-threaded opening 16 disposed between and arranged at right angles to said openings 12 and 14. Fluid is adapted to flow into the casing through a pipe 18 screw-threaded in the opening 12; and fluid is adapted to flow out of the casing through a pipe 20 screw-threaded in the opening 16. Said other opening 14 may be removably closed by a cover which, preferably, is a pipe plug 22 screw-threaded in said opening 14. When the valve is installed in a pipe line access to the interior of the valve casing, for cleaning, and the removal of parts therefrom, is provided through the opening 14, the pipe plug 22 being removable for this purpose.

The valve is provided with a valve-seat bushing 24 which is screw-threaded in the opening 16 and preferably extends for a substantial distance into the casing 10 and is provided, at its inner end, with a valve-seat 26 of approximately spheroidal formation. The said outlet pipe 20 is adapted to be received in the opening 16 behind said valve-seat bushing and may serve to prevent the backing-out of the bushing. Said bushing, by reason of its screw-threaded connection with the casing 10, may be adjusted for proper alignment with the movable member of the valve.

The movable valve member includes a clapper 28 which is of circular or disc-formation and is provided with a, preferably spheroidal, valve seating face 30 which conforms with the valve seat 26 of the bushing 24. An arm 32 is formed integrally with said clapper and extends laterally and rearwardly thereof and is provided with a transverse shaft-opening 34 which, preferably, is of square, or other non-circular, cross-section.

Said clapper 28 is supported on a shaft which is journalled in the valve casing below both the inlet and outlet openings thereof. Said shaft includes an intermediate section 36 which is of square or other non-circular cross-section conformed with the opening 34 in the clapper and received, preferably loosely, therein. The shaft is also provided with cylindrical bearing sections 38 and 40.

Said shaft is journalled in bushings 42 and 44 which are removably disposed in alignment in opposite sides of the valve casing below said openings 12 and 16. Both bushings are provided with reduced end-portions 46 which extend into the valve casing and are disposed on opposite sides of the clapper arm 32 and are arranged to limit the axial movement of the clapper. The bushings are also provided, intermediate their ends, with pipe-threads 48 which are received in aligned pipe or taper-threaded openings in the valve casing, whereby to secure the bushings removably therein in a fluid-tight manner. Bushing 42 is provided with a hexagonal or equivalent outer wrench-receiving end-portion 50. Said bushing, also, is formed with an internal recess 52 which is closed at its outer end, and the end 38 of the shaft is journalled in said recess.

The bushing 44 is provided with an intermediate hexagonal wrench-receiving section 54, and an externally screw-threaded outer end-portion 56 on which a packing cap 58 is screw-threaded. The end 40 of said shaft is extended outwardly beyond said bushing and a packing medium 60 is disposed about said shaft within said cap 58, to prevent leakage of fluid from the casing along the shaft.

An operating handle 62 is secured to the extended end of said shaft, preferably out of the plane including said clapper, and may also function as a weight to hold the clapper in open position during normal fluid flow through the valve.

Said bushings 42 and 44 are interchangeable whereby the valve may be assembled in casings having relatively reversed positions of the outlet openings.

Under normal conditions of fluid flow, the clapper is supported away from the bushing 24, by its weight, and by the weight of the handle 62. When the fluid flow becomes abnormally high, the pressure of the fluid on the rear face of the clapper overbalances the pressure on the front face and serves to overcome the weight of the clapper and move it against the bushing, thereby closing the valve.

The arrangement of the pivotal support for the clapper below the inlet and outlet openings of the valve casing assists materially in providing a positive and reliable operation of the valve for whatever condition of fluid flow it may be set.

The combination of the spheroidally-formed valve seating faces on the clapper and bushing, and the somewhat loose connection between the clapper and shaft, provide means whereby the clapper may be self-seating on the valve seat on the bushing, whereby to compensate for slight inaccuracies in alignment of the various components.

The valve may be adjusted to close at various values of fluid flow by means of an adjusting screw 64; which screw is adjustably screw-threaded into the valve casing and is arranged to engage the upper end of the clapper and limit its normally-open position with respect to the bushing. The smaller the distance from the clapper to the bushing the less will be the value of fluid flow at which the clapper will be moved to shut-off the flow.

In the modification illustrated in Fig. 3 the outlet opening 16ª is at an angle other than a right angle with the inlet opening 12, the construction otherwise being essentially the same as that illustrated in Figs. 1 and 2.

I claim:

1. An automatic shut-off valve comprising a casing having angularly-related inlet and outlet openings, a valve clapper disposed in said casing and having a pivotal support below both openings and extended upwardly thereabove into a position in which it is adapted to close the outlet opening by abnormal fluid pressure, and means to support said clapper normally in open position.

2. An automatic shut-off valve comprising a casing having angularly-related inlet and outlet openings, a valve clapper disposed in said casing and having a pivotal support below both openings and extended upwardly thereabove into a position in which it is adapted to close the outlet opening by abnormal fluid pressure, and means to support the clapper normally in one of various open positions.

3. An automatic shut-off valve comprising a casing having angularly-related inlet and outlet openings, a valve clapper disposed in said casing and having a pivotal support below both openings and extended upwardly thereabove into a position in which it is adapted to close the outlet opening by abnormal fluid pressure, and means to support the clapper normally in one of various open positions comprising a member having an adjustable screw-threaded connection with and extended into said casing in position to be engaged by the upper end of said clapper.

4. An automatic shut-off valve comprising a casing having inlet and outlet openings, a third opening opposite one of said openings, a removable closure for said third opening, a valve clapper disposed within and having a pivotal support in said casing above said third opening and extended above said pivotal support into a position in which it is adapted to close said outlet opening by abnormal fluid pressure and biased for movement away from said outlet opening when in normal open position, and means to support said clapper normally in open position.

5. An automatic shut-off valve comprising a casing having inlet and outlet openings, a third opening opposite one of said openings, a removable closure for said third opening, a valve clapper disposed within and having a pivotal support in said casing and extended upwardly from said pivotal support into a position in which it is adapted to close said outlet opening by abnormal fluid pressure and biased by its weight for movement away from said outlet opening when in normal open position, and means to support said clapper normally in open position, and adapted to vary the open position thereof, comprising a member having an adjustable screw-threaded connection with and extended into said casing immediately beneath the inlet opening and in position to engage the upper portion of said clapper.

6. An automatic shut-off valve including a casing having inlet and outlet openings, and a movable valve-member disposed within said casing in front of the outlet opening and in a position to be impinged on both sides by the fluid passing through the casing and having means normally to bias it for movement toward open position, said valve-member constructed and arranged to be closed by an abnormal pressure of the fluid passing through the casing.

7. An automatic shut-off valve including a casing having inlet and outlet openings, opposed bushings carried by said casing below both openings and taper-screw-threaded in the side walls thereof, a shaft journalled in said bushings and extended outwardly beyond one of said bushings, a weighted operating handle fixed to the extended end of said shaft, a valve clapper disposed within said casing above said shaft and adapted to close the outlet opening by abnormal pressure of the fluid passing through the casing, said shaft having a square intermediate section disposed between said bushings and received in a corresponding passage in the lower end of said clapper, and a valve-adjusting screw adjustably screw-threaded in said casing in position to engage the upper end of said valve clapper and normally support it in one of various open positions thereof, said clapper being normally biased by gravity to remain in open position.

8. An automatic shut-off valve including a casing having inlet and outlet openings, opposed bushings carried by said casing below both openings and taper-screw-threaded in the side walls thereof, a shaft journalled in said bushings and extended outwardly beyond one of said bushings, a weighted operating handle fixed to the extended end of said shaft, a valve-seat bushing screw-threaded in the outlet opening, a valve clapper disposed within said casing above said shaft and adapted to engage and close the passage in said bushing by abnormal pressure of the fluid passing through the casing, said shaft having a square intermediate section disposed between said bushings and received in a corresponding passage in the lower end of said clapper, and a valve-adjusting screw adjustably screw-threaded in said casing in position to engage the upper end of said valve clapper and normally support it in one of various open positions thereof, said clapper being normally biased by gravity to remain in open position.

In testimony whereof, I have signed my name to this specification.

ALBERT J. WALSH.